United States Patent [19]
Landers

[11] Patent Number: 5,136,523
[45] Date of Patent: Aug. 4, 1992

[54] SYSTEM FOR AUTOMATICALLY AND TRANSPARENTLY MAPPING RULES AND OBJECTS FROM A STABLE STORAGE DATABASE MANAGEMENT SYSTEM WITHIN A FORWARD CHAINING OR BACKWARD CHAINING INFERENCE CYCLE

[75] Inventor: Terry A. Landers, Woburn, Mass.

[73] Assignee: Digital Equipment Corporation, Maynard, Mass.

[21] Appl. No.: 679,155

[22] Filed: Mar. 26, 1991

Related U.S. Application Data

[63] Continuation of Ser. No. 418,954, Oct. 6, 1989, abandoned, which is a continuation of Ser. No. 213,549, Jun. 30, 1988, abandoned.

[51] Int. Cl.$^5$ .............................................. G06F 15/18
[52] U.S. Cl. ........................................ 395/54; 395/52; 395/600
[58] Field of Search ........................ 364/513, 200, 900

[56] References Cited

U.S. PATENT DOCUMENTS 4,649,515  3/1987  Thompson et al. ................ 364/900

OTHER PUBLICATIONS

Expert systems and the capacity crunch; Moran; Computer Decisions; vol. 20, No. 6; pp. 78-81; Jun. 1988.
Chau, R. et al., "A framework for knowledge based systems in nial", IEEE. 6th Ann. Int'l. Phoenix Conf. on Computers and Communications, Feb. 25-27, 1987, pp. 286-291.
Bocca, J., "Logic languages and relational databases: the design and implementation of Educe", ICL Tech. Journal, vol. 5, No. 3, May, 1987, Oxford, pp. 425-450.
Yokota, H. et al., "A model and an architecture for a relational knowledge base", IEEE, 13th Ann. Int'l. Symp. on Computer Architecture, Jun. 2-5, 1986, Tokyo, pp. 2-9.
Kaiser, G. E. et al., "Database support for knowledge-based engineering environments", IEEE Expert, vol. 3, No. 2, Summer 1988, pp. 18-32.

Primary Examiner—Allen R. MacDonald
Attorney, Agent, or Firm—Fish & Richardson

[57] ABSTRACT

A system for mapping rules and objects from a database system during an inference cycle includes a database system a knowledge request translator, and an inference system. The database system stores both the facts and rules. The knowledge request translator, in response to rule retrieval requests, retrieves rules from the database system, each rule retrieval being based on rule selection criteria that are included in the rule request. The inference system generates rule retrieval requests, including rule selection criteria, for use by the knowledge request translator. The inference system initiates inference operations in connection with rules retrieved by said knowledge request translator, and facts in the database system. In initiating inference operations, the inference system supplies fact criteria to the knowledge request translator, which generates, in response thereto, database inquiries to initiate pattern matching operations in connection with the facts in the database system. The results of the pattern matching operations are used in connection with subsequent processing during the inference operations.

40 Claims, 11 Drawing Sheets

<SLOT_REL_VAL_LIST>

{[S] CN ([SN < REL_OP><VAL EXP>}...)}...  →{COMMAND>}...
         └──────┬──────┘                    └────┬────┘
          <SLOT_REL_VAL>                   < ACTION _ LIST >

└──────────────┬──────────────┘        COMMAND = CREATE<FRAME_PATTERN>
       < FRAME __ PATTERN >                         -OR-
                                            DELETE<FRAME_PATTERN>
└──────────────┬──────────────┘                    -OR-
      < FRAME __ PATTERN __ LIST >         UPDATE<FRAME_PATTERN>
                                                   -OR-
                                            PRINT "TEXT STRING"
                                                   -OR-
                                                  HALT

FIG. 2A

<FIELD _ REL _ VAL>
┌──────────┴──────────┐
PRED_NAME({F_NAME<REL_OP><VAL_EXP>}...)    →{<PATTERN>} ...
          └──────────┬──────────┘             └────┬────┘
           <FIELD_REL_VAL_LIST>               <PATTERN_LIST>

└──────────────┬──────────────┘
         <PRED_PATTERN>        <PATTERN>=[S]<FRAME_PATTERN>
                                         - OR -
                                       <PRED _ PATTERN>

FIG. 2B

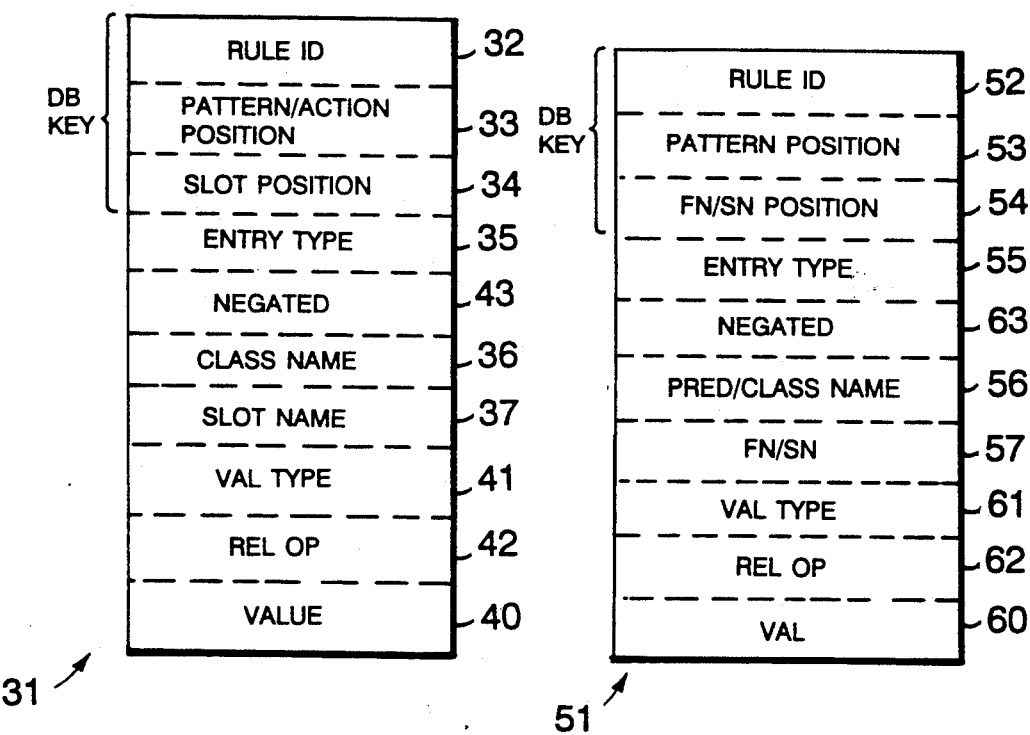

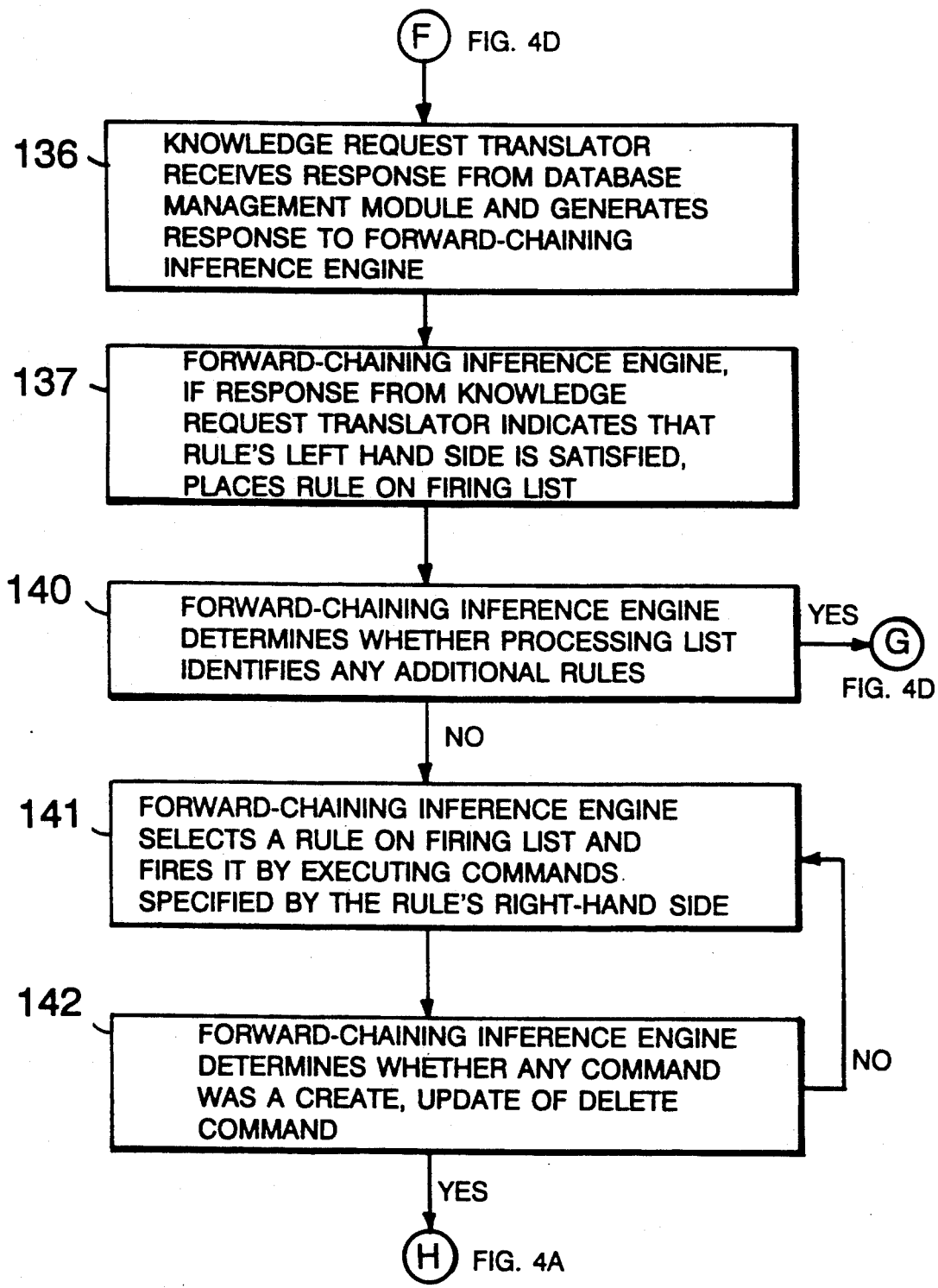

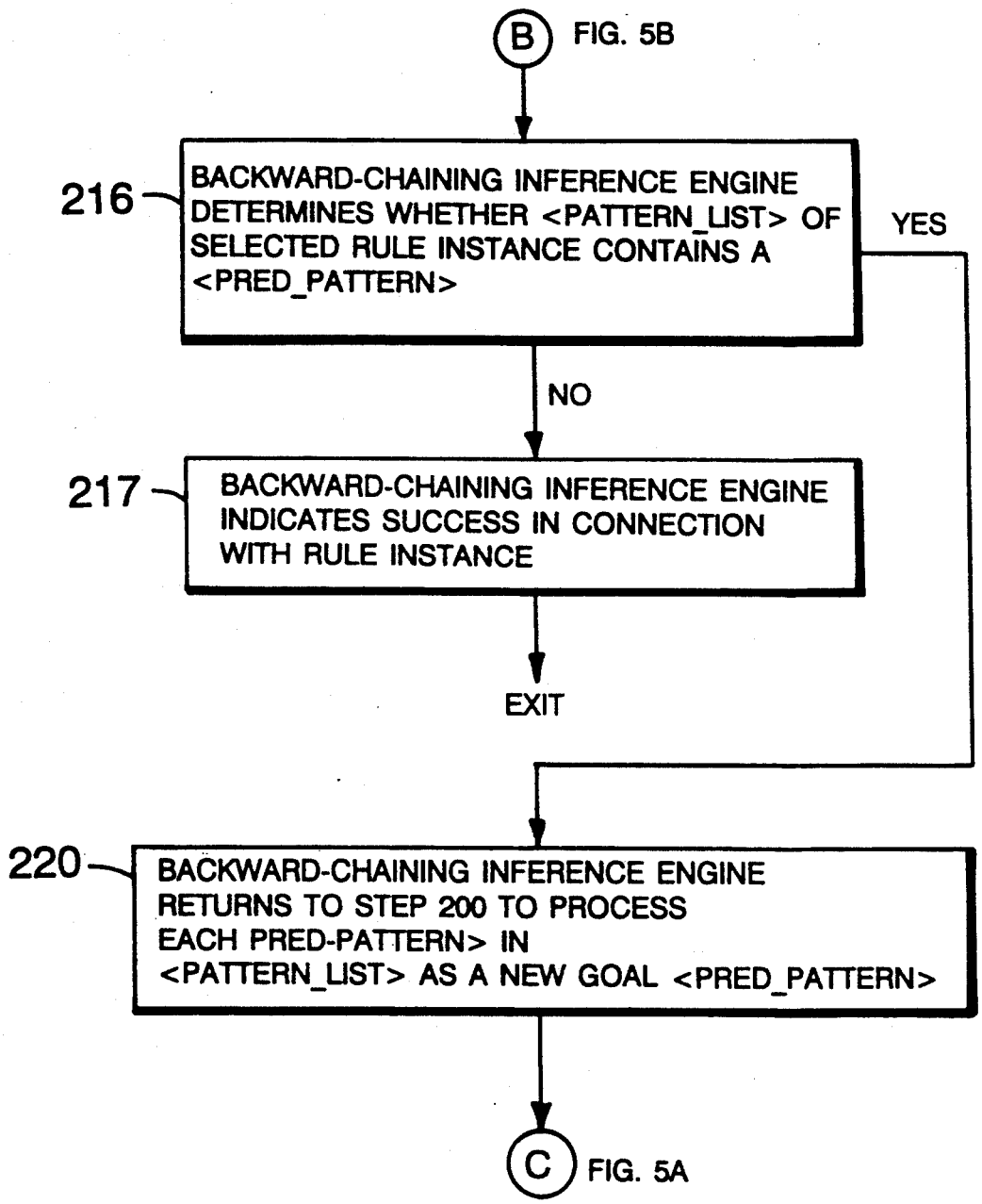

SYSTEM FOR AUTOMATICALLY AND TRANSPARENTLY MAPPING RULES AND OBJECTS FROM A STABLE STORAGE DATABASE MANAGEMENT SYSTEM WITHIN A FORWARD CHAINING OR BACKWARD CHAINING INFERENCE CYCLE

This is a continuation of copending application Ser. No. 07/418,954 filed on Oct. 6, 1989 (now abandoned) which is a continuation of Ser. No. 07/213,549, filed on Jun. 30, 1988 (now abandoned).

BACKGROUND OF THE INVENTION

1. Field of the Invention

The invention relates generally to the field of artificial intelligence, and more specifically to a system for manipulating rules and facts during an inference cycle.

2. Description of the Prior Art

Rule-based artificial intelligence systems, generally known as expert systems, typically include a set of rules, forming a "knowledge base", one or more facts, and an inference engine that manipulates the rules in response to the facts. Typical artificial intelligence systems include two general types of rules, namely, forward-chaining rules and backward-chaining rules, with the inference engine including a forward-chaining inference portion that operates in conjunction with the forward-chaining rules and a backward-chaining inference portion that operates in conjunction with the backward-chaining rules.

A forward-chaining rule is used to conclude new facts from a set of facts. More specifically, in response to a change of facts, the inference engine attempts to match conditions in each of the forward-chaining rules to the facts. If the conditions of a particular forward-chaining rule match the facts, the rule is said to "fire", and the inference engine then performs actions or operations specified in the rule. These operations may include, for example, addition, deletion and/or modification of facts, transmission of results to a user, and so forth. If, during processing of a forward-chaining rule, the inference engine adds, deletes or modifies a fact, the inference engine repeats these operations in response to the new or modified facts in the database, which may, in turn, cause other rules to fire. Forward-chaining rule processing proceeds iteratively until no further additions, modifications or deletions occur in connection with the facts.

A backward-chaining rule, on the other hand, is used to determine, given a conclusion, termed a goal or predicate, whether the predicate is supported by the facts, and may also identify the facts which support the predicate. A backward-chaining rule identifies the facts which are required to support the predicate. In addition, a backward-chaining rule may also identify other predicates, termed sub-goals, which, in turn, identify other backward-chaining rules which are also required to support the predicate. Since each sub-goal may, in turn, contain other sub-goals, backward-chaining rule processing proceeds, iteratively processing rules relating to all of the sub-goals, until all sub-goals are satisfied, at which point the main goal is determined to be supported by the facts.

In a typical expert system, the facts and rules are maintained by the inference engine in virtual memory as the expert system is running. In such systems, sharing of facts and rules among a plurality of operators is difficult. In addition, recovery from errors or a breakdown of the digital data processing system processing the expert system may be very difficult.

SUMMARY OF THE INVENTION

The invention provides a new and improved expert system for manipulating rules and facts during an inference cycle.

In brief summary, the new system includes a database system, a knowledge request translator, and an inference system. The database system includes a plurality of storage locations for storing facts and rules. The knowledge request translator, in response to rule retrieval requests, retrieves rules from the database system, with the rule retrievals being based on rule selection criteria that are included in the rule requests. The inference system generates rule retrieval requests, including rule selection criteria, for use by the knowledge request translator. In addition, the inference system performs inference operations in connection with rules retrieved by said knowledge request translator. The inference system initiates matching operations in connection with patterns in the rules. The knowledge request translator, during a matching operation, enables the database system to perform a match, and provides a response to the inference system to indicate whether the match was successful. The inference system determines whether the rules are satisfied based on the responses from the knowledge request translator during the matching operations.

By storing the rules and facts in a database system, rather than in the virtual memory of the inference system, several advantages are achieved. Since, as is common, the database system may be shared among a number of operators, the rules may be also be shared among a number of operators. In addition, typical database management systems provide extensive capabilities to resolve concurrency of access requests and to facilitate recovery from errors, which are not available in typical expert systems. Furthermore, since the rules that are retrieved from the database and moved into the virtual memory of the inference system are only the ones likely to fire as indicated by the selection criteria that accompanied the rule retrieval request, the storage area need not be sufficiently large as to be able to store all of the rules. The virtual memory for the inference system need only be large enough to store the rules that are likely to fire, as retrieved by the knowledge request translator.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2A and 2B are useful in understanding the structure of forward chaining rules and backward chaining rules, respectively, in the system depicted in FIG. 1;

FIGS. 3A-1 and 3A-2 depict the data structure of a forward chaining rule, as depicted in FIG. 2A, as stored in the data base module depicted in FIG. 1;

FIGS. 3B-1 and 3B-2 depict the data structure of a backward chaining rule, as depicted in FIG. 2B, as stored in the data base module depicted in FIG. 1;

FIGS. 4A through 4F depict flow diagrams useful in understanding the operation of the system depicted in FIG. 1 during forward-chaining rule processing; and FIGS. 5A through 5C depict flow diagrams useful in understanding the operation of the system depicted in FIG. 1 during backward-chaining rule processing.

DETAILED DESCRIPTION OF AN ILLUSTRATIVE EMBODIMENT

1. General Description

Figure 1:
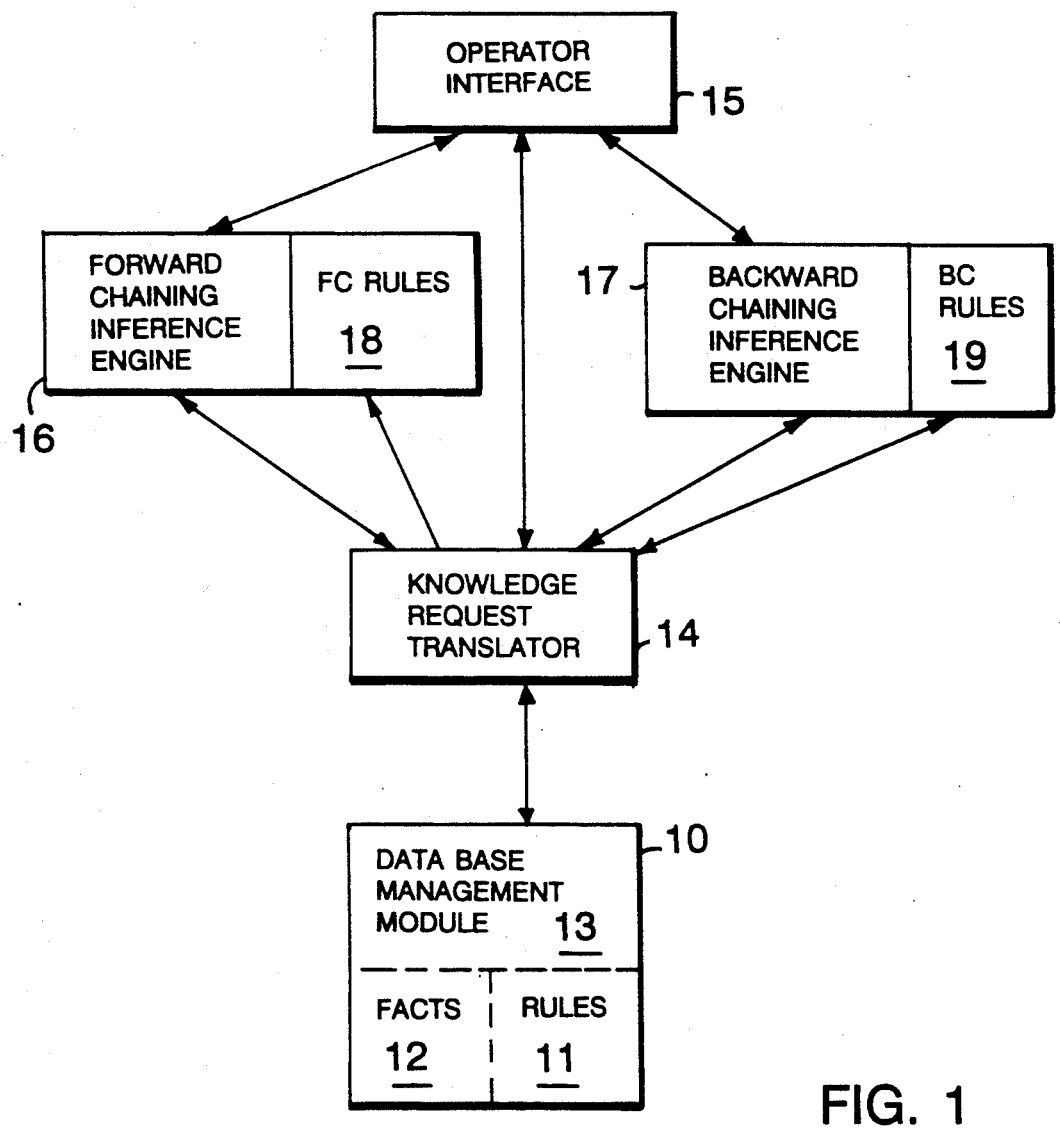
FIG. 1 is a general functional block diagram depicting the major functional modules of a system constructed in accordance with the invention.

FIG. 1 is a general functional block diagram depicting the major functional modules of a system constructed in accordance with the invention. With reference to FIG. 1, the system includes a database system 10 which stores both rules and facts. In the embodiment depicted in FIG. 1, the rules are stored in a rules portion 11 and facts are stored in a facts portion 12. In the database system 10, both the rules and facts are stored as database records. The detailed structure of database records in which rules are stored are described below in connection with FIGS. 3A-1 through 3B-2. The rules portion 11 and facts portion 12 of database system 10 are both controlled by a data base management module 13, which receives inquiries from a knowledge request translator 14, processes them, during which it may retrieve data from, or store data in, either the rules portion 11 or the facts portion 12 of the database system 10. In addition, if the inquiry is a retrieval operation, the data base management module 13 returns the data, which may relate to either a fact or a rule, to the knowledge request translator 14.

The knowledge request translator 14, in turn, operates in response to requests from an inference system comprising a forward-chaining inference engine 16 and a backward-chaining inference engine 17, or from an operator interface 15. The operator interface 15 may update facts in, modify or load rules into, or exercise the rules in, the database system 10 through the knowledge request translator 14. The forward-chaining inference engine 16, in response to selected operations initiated by an operator through the operator interface, performs forward-chaining inference operations in connection with forward-chaining rules stored in the rules portion 11 of database system 10. The backward-chaining inference engine 17 performs, in response to backward-chaining inference requests initiated by an operator through the operator interface 15, backward-chaining inference operations in connection with backward-chaining rules stored in the rules section 11 of database system 10.

As described in detail below, during an inference operation initiated by the forward-chaining inference engine 16, the knowledge request translator 14 first requests the database system 10 to identify all of the rules in rules portion 11 of the database system 10 which might fire based on the facts in the facts portion 12 of the database system 10 and as initiated by the command just executed. The knowledge request translator 14 then enables the database system 10 to retrieve the rules which may fire from the rules portion 11 of the database system 10, and transfer them to the knowledge request translator 14. Upon receiving the rules from the database system 10, the knowledge request translator 14 assembles them in a forward chaining rules storage area 18 for processing by the forward chaining inference engine 16.

The forward-chaining inference engine separately processes each of the rules assembled in the forward chaining rules storage area 18. In processing each rule, the forward-chaining inference engine 16 initiates pattern matching operations, which are processed by the knowledge request translator 14 and the database system 10, in connection with all of the various patterns which form the conditions in the rule. If the forward-chaining inference engine determines that a rule's conditions are satisfied, it fires the forward-chaining rule, that is, it executes the command or commands that are specified in the forward-chaining rule. The execution of the command may change the facts in the database, which may, in turn, initiate further forward-chaining inference operations.

Similarly, during an inference operation initiated by the backward-chaining inference engine 17 in response to a request from the operator interface 15, the knowledge request translator 14 first requests the database system 10 to select and retrieve all of the rules in rules portion 11 of the database system 10 which might prove the goal received from the operator interface 15. The knowledge request translator 14 then retrieves the rules from the rules portion 11 of the database system 10, and assembles them in a backward-chaining rules storage area 19 for processing by the backward chaining inference engine 17.

The backward-chaining inference engine 17 processes each of the backward-chaining rules iteratively. During processing of each backward-chaining rule, the backward-chaining inference engine 16 initiates pattern matching operations, which are processed by the knowledge request translator 14 and the database system 10, in connection with all of the various patterns which form the goal predicates and frame patterns in the rule. If the backward-chaining inference engine determines that the frame patterns are satisfied, it initiates processing of the sub-goal predicates in the same manner, and proceeds until all of the sub-goal predicates are satisfied, in which case it reports to the operator interface 15 that the goal predicate has been proven, along with the facts which prove the goal predicate, or until it determines that a sub-goal predicate cannot be proven, in which case it reports to the operator interface 15 that the goal predicate cannot be proven.

By storing the rules and facts in a database system a number of advantages are achieved. The database management system permits the rules and facts to be sharable among a number of operators. In addition, since typical database management systems provide extensive capabilities to resolve concurrency of access requests and to facilitate recovery from errors, these facilities, which are not available in typical expert systems, are available in the system depicted in FIG. 1.

Furthermore, since the forward- and backward-chaining rules that are moved into the respective storage areas 18 and 19 are only the ones likely to fire or to prove the current goal or sub-goal predicate, the storage areas need not be sufficiently large as to be able to store all of the forward-chaining and backward-chaining rules, respectively. Since typically the rules storage areas are in the virtual memories of the respective inference engines 16 and 17, the virtual memories need only be large enough to store the rules supplied by the knowledge request translator 14.

2. Specific Description

Rule Description

Before proceeding further, it will be helpful to describe a forward-chaining rule and a backward-chaining rule, after which a description of the data structures in which the rules are stored in the rules portion 11 of the database system 10 will be presented, along with a description of operation of the knowledge request translator 14, forward-chaining inference engine 16, backward-chaining inference engine 17 and database system 10. With reference to FIG. 2A, a forward-chaining rule comprises a left-hand side, identified as a <FRAME_PATTERN_LIST>, and a right-hand side, identified as an <ACTION_LIST>. The <FRAME_PATTERN_LIST> includes one or more elements defining conditions which, if they evaluate to TRUE based on the facts in the facts portion 12 of database system 10, indicates that the command or commands specified in the <ACTION_LIST> are to be performed, and if they evaluate to FALSE, indicates that the command or commands specified in the <ACTION_LIST> are not to be performed.

The conditions in the <FRAME_PATTERN_LIST> of a forward-chaining rule are defined by one or more <FRAME_PATTERN>s, which, in turn, are defined by a CN classname and includes one or more <SLOT_REL_VAL>s slot relational value(s) which together form a <SLOT_REL_VAL_LIST>. Each <SLOT_REL_VAL> in a <SLOT_REL_VAL_LIST>, is identified by an SN slot name, and includes a <REL_OP> relational operator and <VAL_EXP> value expression, which may define either a constant value or a value defined by a variable. The facts in the facts portion 12 of database system 10 are stored in logical classes. Each class contains a plurality of entries, with the entries, in turn, having, a plurality of slots which contain the facts.

Each class in facts portion 12 is identified by a class name, and the slots in the entries in a class are identified by a slot name. In a <SLOT_REL_VAL>, the <VAL_EXP> identifies a particular value, and the <REL_OP> relates the value of the <VAL_EXP> to the contents of the slot in the class identified by the CN class name in the facts portion 12 of the database system 10. The <REL_OP> relational operator may, for example, indicate equality, inequality, greater than or less than. Each CN class name in a FRAME_PATTERN> identifies a class in the facts portion 12. Furthermore, each SN slot name in a <SLOT_REL_VAL> identifies a slot in the class in the facts portion 12 identified by the CN class name identified by the <FRAME_PATTERN> which contains the <SLOT_REL_VAL>.

The determination of whether the <FRAME_PATTERN_LIST> of a forward-chaining rule is satisfied, such that the rule will be deemed to fire, depends upon an evaluation of each <FRAME_PATTERN> in the <FRAME_PATTERN_LIST> in conjunction with the value of the S sign associated with the <FRAME_PATTERN>. The S sign, if positive, indicates that the condition represented by the FRAME_PATTERN> is satisfied if there exists, in the facts portion 12 of database system 10, at least one entry in the class identified by the CN class name associated with the <FRAME_PATTERN>, in which the slots have the relationships set forth in all of the <SLOT_REL_VAL>s slot relational values in the <SLOT_REL_VAL_LIST> slot relational value list associated with the <FRAME_PATTERN>. On the other hand, if the S sign associated with the <FRAME_PATTERN> is negative, the condition represented by the <FRAME_PATTERN> is satisfied if no such entry exists in the class. Otherwise, the condition represented by the <FRAME_PATTERN> is not satisfied. The <FRAME_PATTERN_LIST> is satisfied only if all of the <FRAME_PATTERN>s in the forward-chaining rule are satisfied.

As noted above, if the <FRAME_PATTERN_LIST> is satisfied, the command or commands in the <ACTION_LIST> are executed. In one embodiment, five types of commands may be executed, namely, CREATE, DELETE, UPDATE, PRINT and HALT. The CREATE, DELETE and UPDATE commands enable facts to be stored in, deleted from, or modified in the facts portion 12 of the database system 10. The PRINT and HALT commands, on the other hand, enable specific system operations to occur. More specifically, a CREATE command enables an entry to be added to a class, identified in the command, in the facts portion 12 of database system 10. A DELETE command enables an entry to be deleted from a class, as identified in the command, in the facts portion 12 of the database system 10. An UPDATE command enables new values to be stored in an entry, as identified in the command, in the class, as also identified in the command in the facts portion 12 or the database system 10. A PRINT command enables a text string, which is contained in the command, to be displayed by the operator interface 15. Finally, a HALT command enables the system to halt the current forward-chaining operation.

A backward-chaining rule is depicted in FIG. 2B. With reference to FIG. 2B, a backward-chaining rule comprises a left-hand side, identified as a <PRED_PATTERN> predicate pattern, and a right-hand side, identified as a <PATTERN_LIST>. The <PATTERN_LIST>, in turn, includes one or more <FRAME_PATTERN>s, each with an associated S sign, and/or one or more <PRED_PATTERN>s predicate patterns. The <PRED_PATTERN> predicate pattern comprising the left-hand side of the backward-chaining rule identifies the goal to be proven, and is used, as described below in connection with FIGS. 5A through 5C, to identify the backward-chaining rules which may prove the goal. The <FRAME_PATTERN>s on the right-hand side identify facts which tend to prove or disprove the goal, and the <PRED_PATTERN>s predicate patterns on the right-hand side identify sub-goals which must be satisfied, by means of other backward-chaining rules identified thereby, to prove the goal.

A <PRED_PATTERN> predicate pattern, on either the left-hand side or the right-hand side of a backward-chaining rule, includes a <FIELD_REL_VAL_LIST> field relational value list which includes one or more <FIELD_REL_VAL>s field relational values. Each <PRED_PATTERN> predicate pattern is identified with a PRED_NAME predicate name, and each <FIELD_REL_VAL> field relational value is identified with a F_NAME field name. In a <FIELD_REL_VAL> field relational value, the <VAL_EXP> value expression identifies either a constant value or a value defined by a variable, and the <REL_OP> relates the value of the <VAL_EXP> to contents of the rules portion 11 of the database system 10.

The processing of a <FRAME_PATTERN> during processing of a backward-chaining rule to determine whether or not it is satisfied is performed in a similar manner as during processing of a forward-chaining rule file.

Rule Database Structure

As noted above, the rules, including both the forward-chaining rules and the backward-chaining rules, are defined by one or more database records stored in the rules portion 11 of the database system 10. FIGS. 3A-1 through 3B-2 depict data structures in the database system 10 for the rules, with FIGS. 3A-1 and 3A-2 depicting the data structures for the forward-chaining rules and FIGS. 3B-1 and 3B-2 depicting data structures for the backward-chaining rules. With reference to FIG. 3A-1, the rules portion 11 of the database system 10 includes one rule identification record 30 associated with each forward-chaining rule. The rule identification record 30 includes a single field which includes a rule identification value.

The rules portion 11 also includes one record 31, as depicted in FIG. 3A-2, that is associated with each <SLOT_REL_VAL> slot relational value in a <FRAME_PATTERN> IN either the left-hand side <FRAME_PATTERN_LIST> or a right-hand side <COMMAND>, in a rule. A record 31 includes a number of fields, including a rule identification field 32, a pattern/action position field 33 and a slot position field 34, the contents of all of which serves to identify the record in the context of the rules. Specifically, the contents of the rule identification field 32 identifies the rule of which the associated <SLOT_REL_VAL> slot relational value forms a part. The contents of the pattern/action position field 33 identifies a <FRAME_PATTERN> or <COMMAND> in the <FRAME_PATTERN_LIST> or <ACTION_LIST> of the rule. Finally, the slot position field 34 identifies a <SLOT_REL_VAL> slot relational value in the <SLOT_REL_VAL_LIST> slot relational value list in the <FRAME_PATTERN> in either the left-hand side or the command in the right hand side. The triple formed by the values in the rule identification field 32, pattern/action position field 33 and slot position field 34 uniquely identify the location of the <SLOT_REL_VAL> slot relational value within a specific rule, and thus also serves to uniquely identify the record 31 in the rules portion 11 of database system 10.

The record 31 also has a number of additional fields. In particular, the contents of an entry type field 35 identifies whether the record relates to the left-hand side or the right-hand side of a forward-chaining rule (FIG. 2A), and, if it relates to the right-hand side, identifies the type of command, that is, it indicates whether the command is a CREATE, DELETE, UPDATE, PRINT, or HALT command.

If the record relates to the left-hand side, the contents of a class name field 36 and a slot name field 37 identify a class and slot, respectively, in the facts portion 12 of the database system 10. The contents of a value field 40 and value type field indicate a value and value type, that is, whether the value contained in the value field 40 is a constant or variable, and the contents of a relational operator field 42 identify a relational operator. In processing a <SLOT_REL_VAL> slot relational value in the left-hand side of a forward-chaining rule, the value contained in the value field 40 is compared, using a relational operator identified by the contents of relational operator field 42, to the contents of the slot of the facts portion 12 of the database system 10 identified by the slot name field 37 in the class identified by the class name field 36.

On the other hand, if the record relates to the right-hand side of a forward-chaining rule, the contents of a class name field 36 and a slot name field 37 identify a class and slot, respectively in the facts portion 12 of the database system 10, and the contents of a value field 40 and value type field indicate a value and value type, that is, whether the value contained in the value field 40 is a constant, variable or a text string that may be transmitted to the operator interface 15 for display to the operator in response to a PRINT command. If the rule fires, that is, if the left-hand side is satisfied, if the command is a CREATE command, a new entry is created in the class identified by the contents of the class name field 36, and the contents of the value field 40 is stored in a slot therein identified by the contents of the slot name field 37. If the command is a DELETE command, entries, identified by the <FRAME_PATTERN> which includes the <SLOT_REL_VAL> slot relational value defined by the record 31, are deleted. Similarly, if the command is an UPDATE command, the contents of the value field 40 are stored in the slot identified by the slot name field 37 in the class identified by the class name field 36.

As described above, FIGS. 3B-1 and 3B-2 depict data structures for the backward-chaining rules. With reference to FIG. 3B-1, the rules portion 11 of the database system 10 includes one rule identification record 50 associated with each backward-chaining rule. The rule identification record 50 includes a single field which includes a rule identification value.

The rules portion 11 also includes one record 51, as depicted in FIG. 3B-2, associated with each <FIELD_REL_VAL> field relational value in a <PRED_PATTERN> predicate pattern in either the right-hand side or the left-hand side and with each <SLOT_REL_VAL> slot relational value in a <FRAME_PATTERN> on the right-hand side. The structure of a record 51 is similar to the structure of a record 31. In particular, the record 51 includes a number of fields, including a rule identification field 52, a pattern position field 53 and a field name/slot name position field 54, the contents of all of which serves to identify the record in the context of the rules. Specifically, the contents of the rule identification field 52 identify the rule which includes the <FIELD_REL_VAL> field relational value or <SLOT_REL_VAL> slot relational value defined by the record. The contents of the pattern position field 53 identifies a <PRED_PATTERN> predicate pattern or <PATTERN> in the <PRED_PATTERN> or <PATTERN_LIST> of the rule. Finally, the field name/slot name position field 54 identifies a <FIELD_REL_VAL> field relational value in the <FIELD_REL_VAL_LIST> field relational value list in the <PRED_PATTERN> predicate pattern in the left-hand side or the <PATTERN> in the <PATTERN_LIST> in the right hand side. The triple formed by the values in the rule identification field 52, pattern position field 53 and field name/slot name position field 54 uniquely identify the location of the <FIELD_REL_VAL> field relational value or <S-

LOT_REL_VAL> slot relational value within a specific rule, and thus also serves to uniquely identify the record 51 in the rules portion 11 of database system 10.

The record 51 also has a number of additional fields. In particular, the contents of an entry type field 55 identifies whether the record relates to the left-hand side or the right-hand side of a backward-chaining rule (FIG. 2B), and, if the record relates to the right-hand side, whether the <PATTERN> is a <FRAME_PATTERN> or a <PRED_PATTERN> predicate pattern. If the record relates to a the right-hand side and the <PATTERN> is a <FRAME_PATTERN>, a negated field 63 indicates whether the <FRAME_PATTERN> is negated, which, in turn, indicates that the S sign associated with the <FRAME_PATTERN> is negative.

The record 51 also includes a predicate/class name field 56 and a field/slot name field 57 whose contents, if they relate to a <FRAME_PATTERN> identify a slot in a class in the facts portion 12 of the database system 10. The contents of a value field 60 and value type field 61 indicate a value and value type, that is, whether the value contained in the value field 60 is a constant or variable, and the contents of a relational operator field 62 identify a relational operator.

Rule Processing

1. Forward-Chaining Rules

As described above, in the forward-chaining rules used in the system depicted in FIG. 1, three types of commands, namely, the CREATE, DELETE and UPDATE commands, may be executed, either in response to a command from the operator interface 15 or in response to processing of another forward-chaining rule, which enable the modification of the contents of the facts portion 12 of the database system 10. In response to any of these commands, the forward-chaining inference engine and knowledge request translator 14 perform the operations generally set forth in the flowchart depicted in FIGS. 4A through 4F to process forward-chaining rules which may fire as a result of the command. On the other hand, in response to the receipt of at goal from the operator interface 15, the backward-chaining inference engine 17 and knowledge request translator 14 perform the operations generally set forth in FIGS. 5A through 5C to determine whether the goal can be satisfied, that is, whether the goal can be proven to be true.

With reference to FIGS. 4A through 4F, the forward-chaining inference engine 16, along with the knowledge request translator 14 and the database management module 13, initially selects the forward-chaining rules likely to fire, retrieves records 31 relating thereto from the rules portion 11 of the database system 10, constructs the rules and loads the constructed rules into the forward-chaining rules storage area 18. The criteria for selecting the rules likely to fire depend upon the type of command which was executed to give rise to the forward-chaining inference operation. In particular, if the command was an UPDATE command (FIG. 4A), the rules selected are those that contain a <FRAME_PATTERN> that have a CN class name and SN slot name that correspond to the class name and slot name in the <FRAME_PATTERN> in the command, since those are the only ones that might fire based on the updated information loaded into the facts portion 12 of the database system 10 in response to the UPDATE command.

On the other hand, if the command was a CREATE command (FIG. 4B), the rules selected are those that contain a <FRAME_PATTERN> that have a positive S sign and a CN class name and a SN slot name that correspond to the class name and slot name in the <FRAME_PATTERN> in the command, since those rules are the only ones that might fire based on the added entry in the class identified by the CN class name.

Finally, if the command was a DELETE command (FIG. 4C), the rules selected are those that contain a <FRAME_PATTERN> that have a negative S sign and a CN class name that corresponds to the class name in the <FRAME_PATTERN> in the command. The only rules that will fire in response to the DELETE command are the ones in which an entry does not exist in the class identified by the CN class name, thus the S sign must be negative.

Figure 4A:
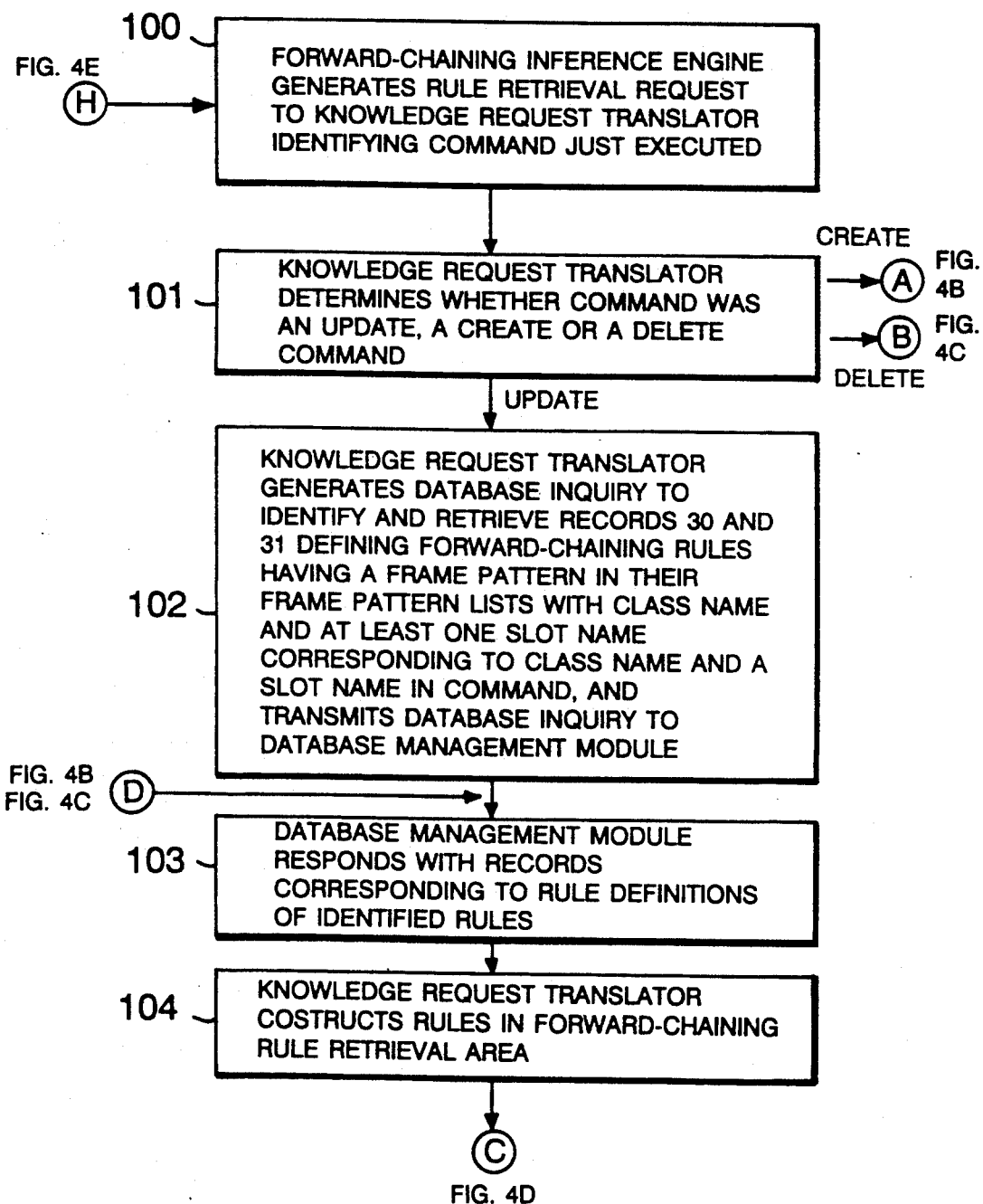

With this background, and with reference to FIG. 4A, in initiating the retrieval of the rules likely to fire in response to execution of a command, the forward-chaining inference engine 16 first generates a rule retrieval request for transmission to the knowledge request translator 14 that includes the command just executed (step 100). The knowledge request translator then determines the type of command that was included in the rule retrieval request (step 101). If the command was an UPDATE command, the knowledge request translator 14 generates a database inquiry for the data base management module 13 that enables the data base management module 13 to identify rules which have, in their left-hand sides, a <FRAME_PATTERN> that has a CN class name and at least one slot with a SN slot name corresponding to the CN class name and SN slot name in the rule retrieval request (step 102).

The data base management module 13 receives the database inquiry generated by the knowledge request translator 14 in step 102 and proceeds to process it. In that processing, the data base management module 13 performs a search operation based on the rules identified in records 30 and records 31 in the rules portion 11 to determine if any have a class name field 36 and slot name field whose contents correspond to the CN class name and SN slot name in the database inquiry from the knowledge request translator 14. If any such rules exist in the rules portion 11 of database system 10, the data base management module 13 responds with the records correspoding to the rule definitions of the rules which it identified during the search (step 103). In response to the receipt of the response from the data base management module 13, the knowledge request translator 14 proceeds to construct the rules in the forward-chaining rules storage area 18 (step 104) for subsequent processing by the forward-chaining inference engine 16.

Figure 4B:
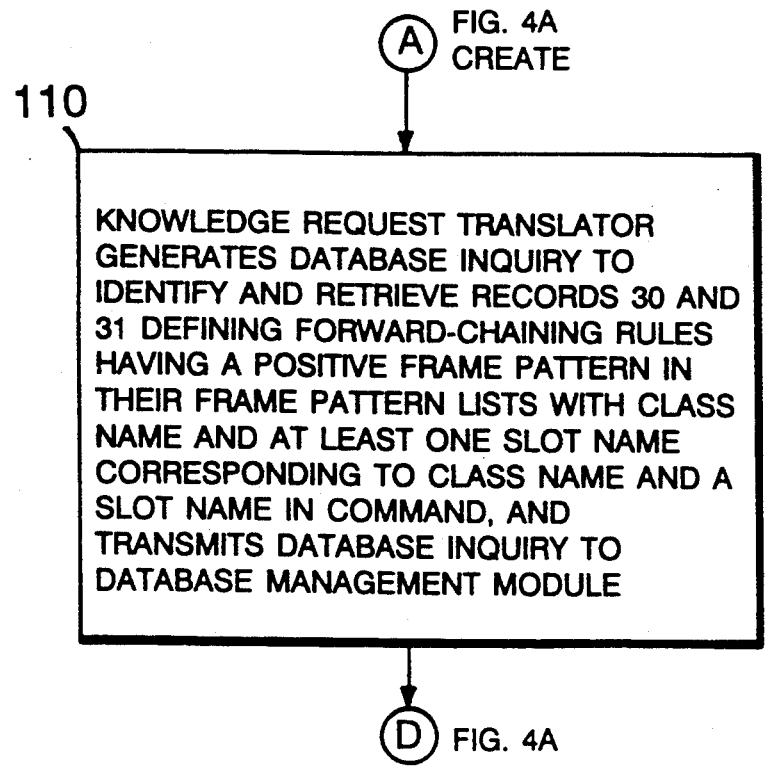

As described above, the rule identification and retrieval procedure differs if the command was a CREATE command or a DELETE command. With reference to FIG. 4B, if the command was a CREATE command, the knowledge request generator 14 sequences from step 101 to step 110, in which it generates a database inquiry which identifies the S sign value as positive, and a CN class name and a SN slot name which it obtained from the CREATE command, and transfers the database inquiry to the database management module 13. Thereafter, the sequence continues with step 103 (FIG. 4A).

Figure 4C:
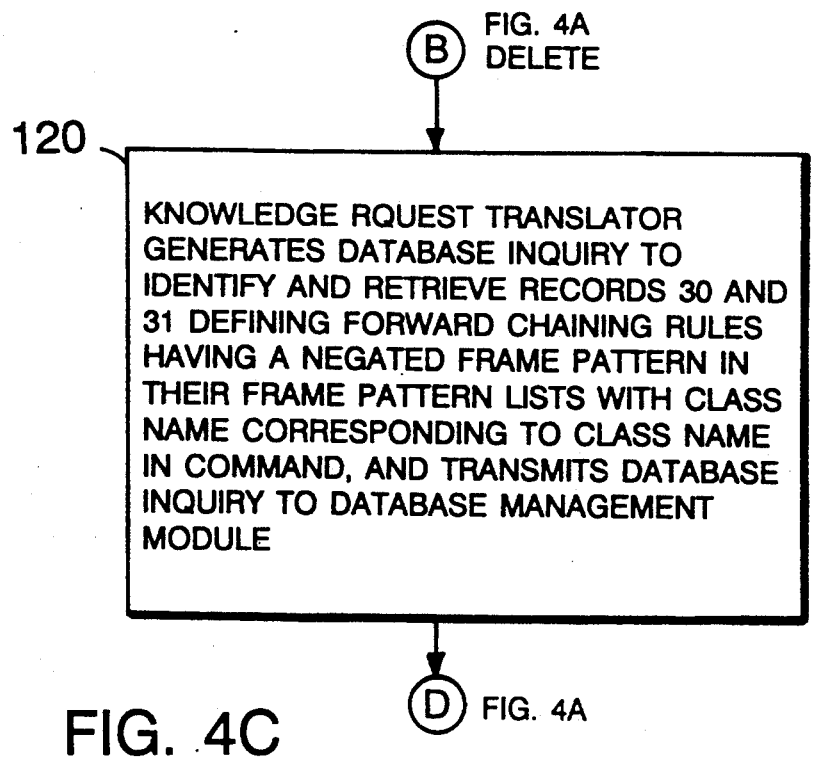

On the other hand, with reference to FIG. 4C, if the command was a DELETE command, from step 101 (FIG. 4A) the knowledge request translator 13 sequences to step 120, in which it generates a database inquiry which identifies the S sign value as negative, and a CN class name which it obtained from the DELETE command, and transfers the database inquiry to the database management module 13. Thereafter, the sequence continues with step 103 (FIG. 4A).

Figure 4D:
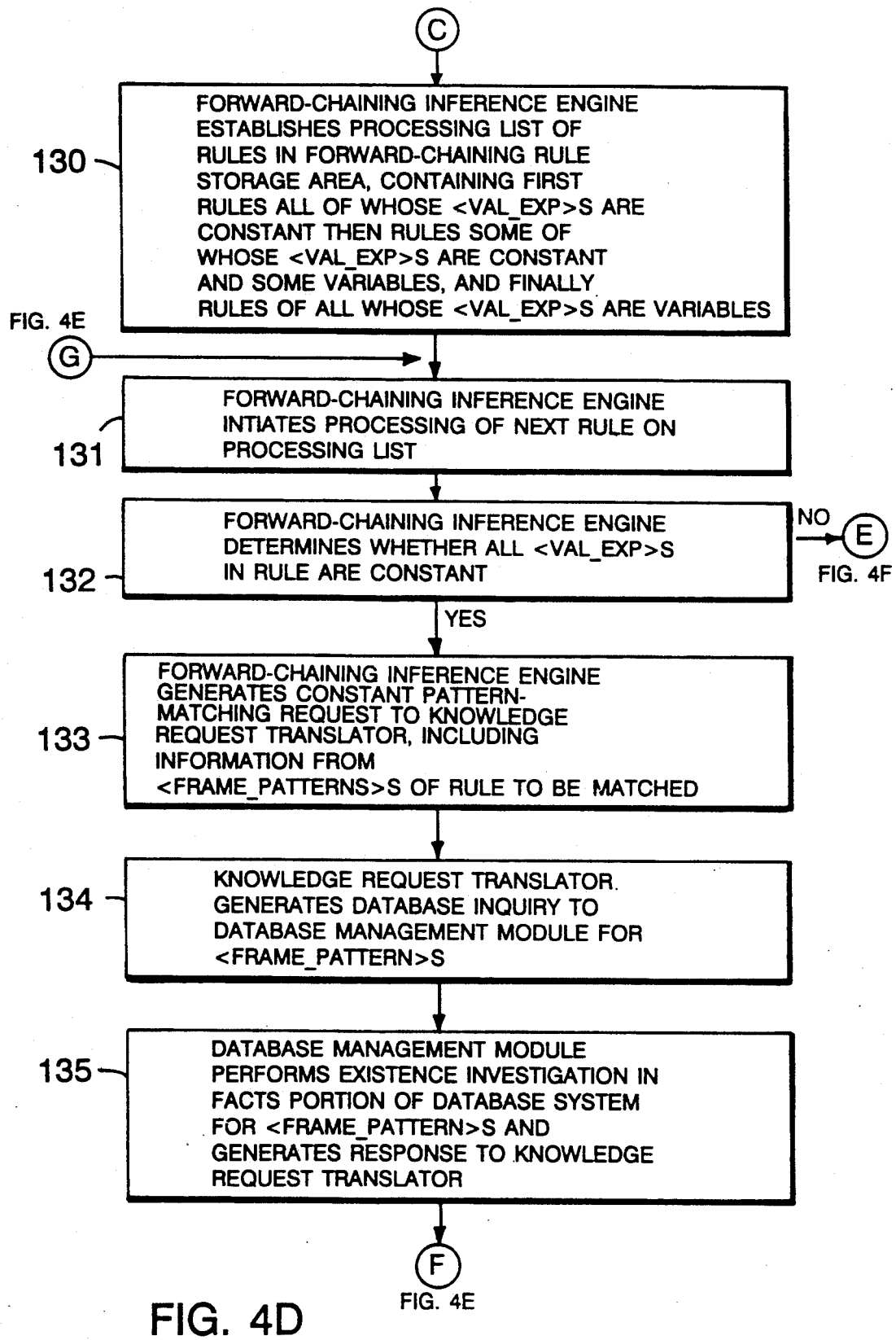
Figure 4F:
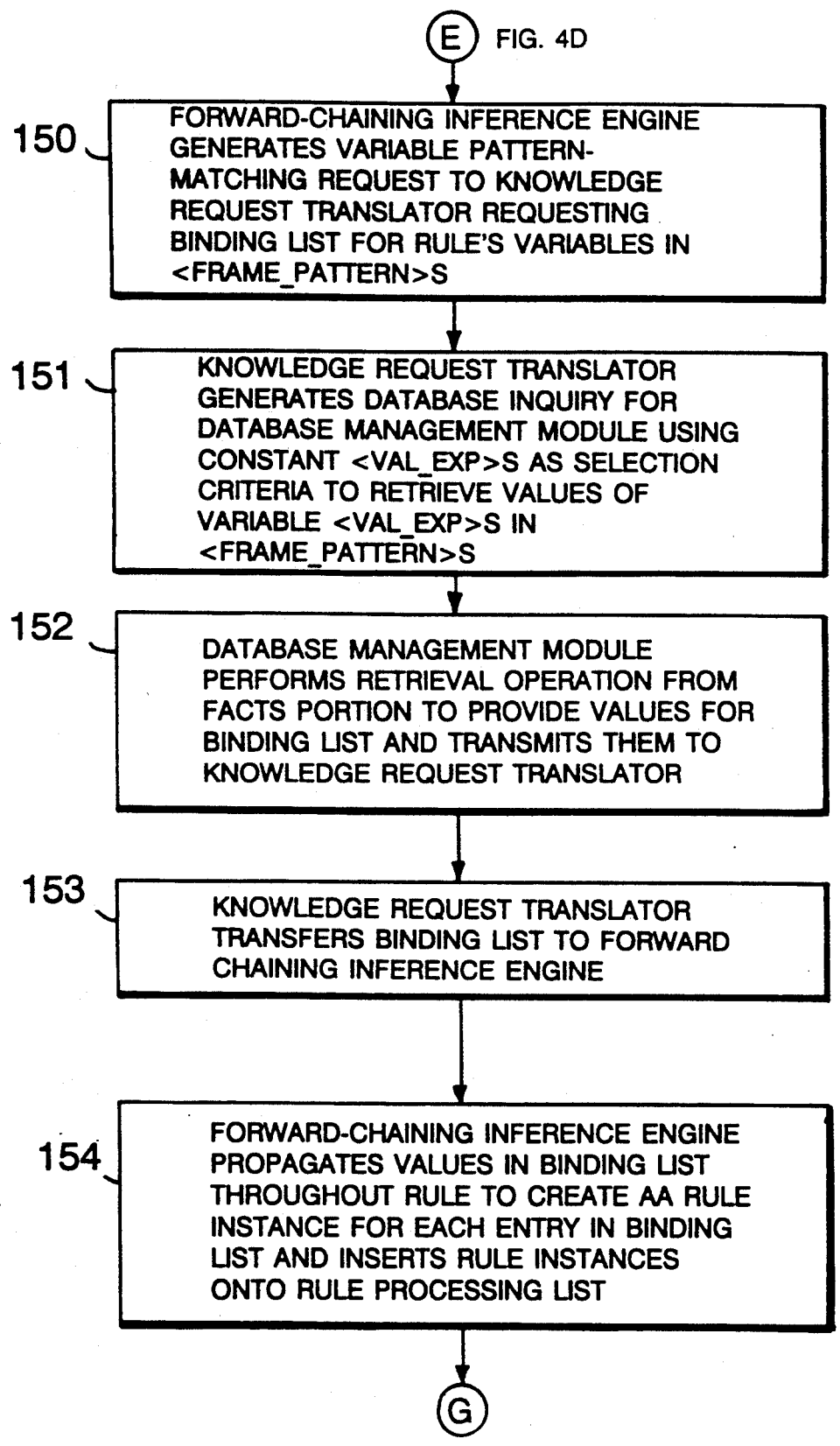

After the knowledge request translator 14 has constructed the rules likely to fire in the forward-chaining rules storage area 18, the forward-chaining inference engine 16 steps to a sequence, shown in FIGS. 4D through 4F, in which it, in conjunction with the knowledge request translator 14 and data base management module 13, processes the rules in the forward-chaining rules storage area 18 to determine which of them fire, based on the facts in the facts portion 12 of database system 10, and fires those which it determines are to fire.

With reference to FIG. 4D, in this operation the forward-chaining inference engine 16 first establishes a processing list, in which it lists the order in which it will process the rules in the forward-chaining rules storage area 18 (step 130). In one embodiment, the forward-chaining inference engine 16 first processes the rules in which the <VAL_EXP> value expressions are all constants, followed by the rules in which some of the <VAL_EXP>s value expressions are constants and some variables, and finally the rules in which all of the <VAL_EXP>s are variables.

The forward-chaining inference engine 16 iteratively initiates processing of each of the rules in the order identified on the processing list. During the first iteration, the forward-chaining inference engine 16 selects for processing the first rule on the processing list (step 131). If all of the <VAL_EXP>s value expressions in the rule are constants (step 132), the forward-chaining inference engine 16 generates a constant pattern-matching request to the knowledge request translator 14 (step 133). The pattern-matching request identifies, for each <FRAME_PATTERN> in the rule's <FRAME_PATTERN_LIST>, the S sign, CN class name, SN slot names, and the <REL_OP> relational operator and <VAL_EXP> value expression in each <SLOT_REL_VAL>.

The knowledge request translator 14 receives the constant pattern-matching request from the forward-chaining inference engine 16 and generates a database inquiry for the <FRAME_PATTERN>s in the constant pattern-matching request, which it transmits to the data base management module 13 (step 134). The database inquiry requests the data base management module 13 to indicate, for each <FRAME_PATTERN>, whether an entry exists in the class identified by the CN class name, which contains slots identified by the SN slot names all of which contain values related to the values identified by the <VAL_EXP>s value expressions by the relational operators identified by the <REL_OP> relational operators in the pattern-matching request. The data base management module 13 them performs an existence investigation, as described above, to determine if such entries exist, and generates a response for the knowledge request translator 14 (step 135). The response indicates whether or not such entries exist for all of the <FRAME_PATTERN>s, thereby indicating whether or not the <FRAME_PATTERN_LIST> is satisfied.

Upon receiving the response from the data base management module 13 for the <FRAME_PATTERN>s, the knowledge request translator 14 generates a response so indicating for transmission to the forward-chaining inference engine 16 (step 136). If the response from the knowledge request translator 14 indicates that the <FRAME_PATTERN_LIST> of the rule being processed is satisfied, the forward-chaining inference engine 16 places the rule onto a firing list, or agenda (step 137).

Following step 137, the forward-chaining inference engine 16 inspects the processing list to determine whether it identifies any further rules to be processed (step 140). If the processing list does identify further rules to be processed, the forward-chaining inference engine 16 returns to step 131 to process the next rule. However, if the processing list does not identify any further rules, the forward-chaining inference engine 16 sequences to steps 141 and 142, in which it fires the rules on the firing list. If the <ACTION_LIST> of a fired rule includes a CREATE, UPDATE or DELETE command, the forward-chaining inference engine 16 returns to step 100 (FIG. 4A) to identify any additional rules to be fired in response thereto.

As described above, the forward-chaining inference engine 16, in step 132, determines whether the rule being processed has any <FRAME_PATTERN>s which includes a <VAL_EXP> value expression which defines a variable value. If the rule does have a <FRAME_PATTERN> with a <VAL_EXP> value expression which does define a variable value, the forward-chaining inference engine 16 diverts to the sequence depicted on FIG. 4F to determine binding lists for the variable values, to convert them into constant values which the forward-chaining inference engine 16 processes as described above in connection with steps 133 through 137 and 140 through 142.

With reference to FIG. 4F, if the rule being processed has a <FRAME_PATTERN> with at least one <VAL_EXP> value expression having a variable value, the forward-chaining inference engine 16 sequences to step 150, in which it generates a variable pattern-matching request to the knowledge request translator 14 requesting a binding list for the variable <VAL_EXP>s value expressions in the <FRAME_PATTERN>s in the <FRAME_PATTERN_LIST>. The knowledge request translator 14 generates a database inquiry to obtain values for the binding list, which it transmits to the data base management module 13 (step 151). The data base management module 13 performs a retrieval operation to retrieve values from the facts portion 12 of the database system 10 to provide values for the binding list, and transmits the values to the knowledge request translator 14 (step 152), which, in turn, transfers them to the forward-chaining inference engine 16 (step 153). The forward-chaining inference engine 16 then propagates the values in the binding list through the rule to create new rule instances (step 154). At that point the forward-chaining inference engine 16 returns to step 131 and processes each of the rule instances as a separate rule.

2. Backward-Chaining Rules

Figure 5A:
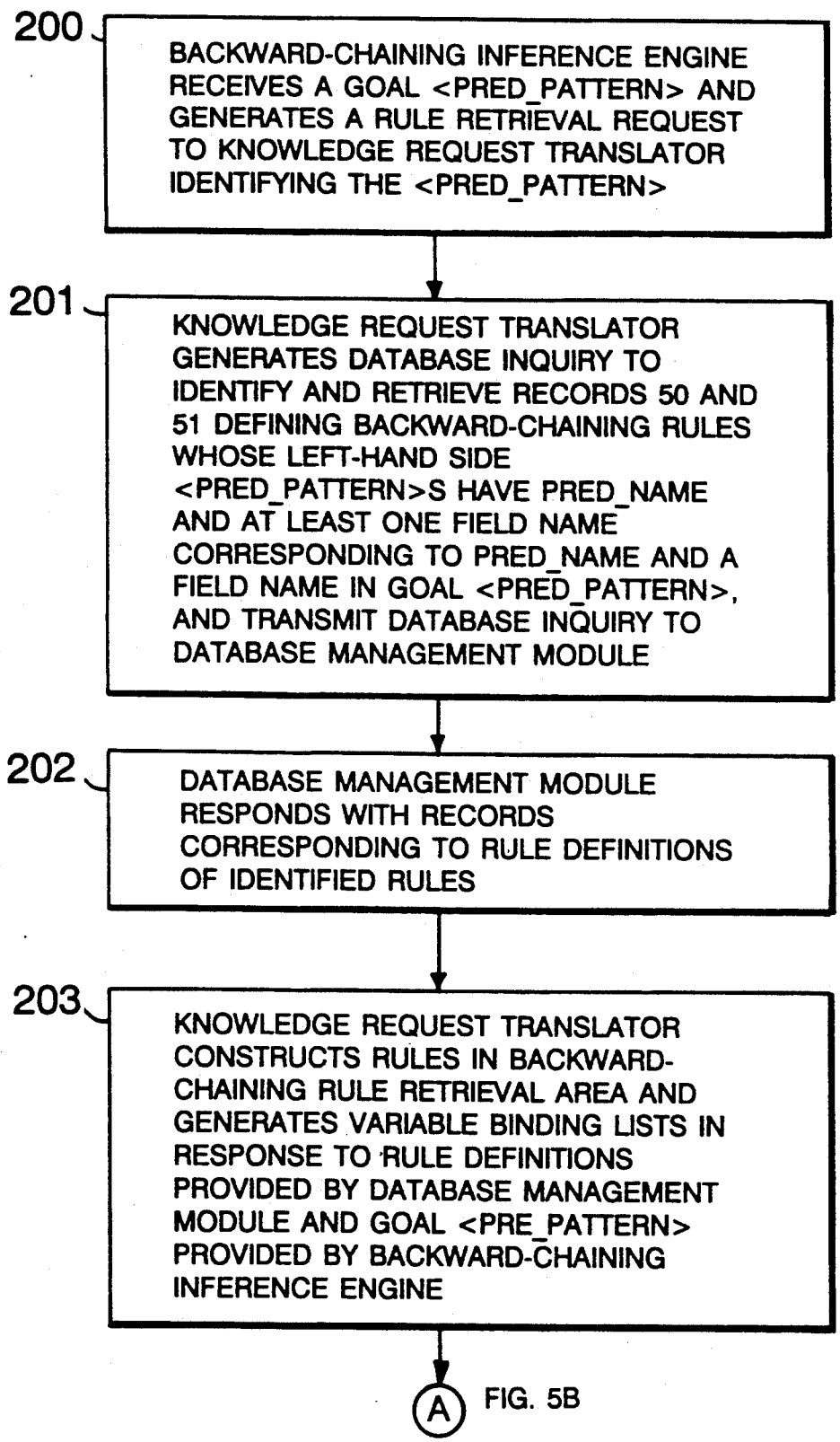
Figure 5B:
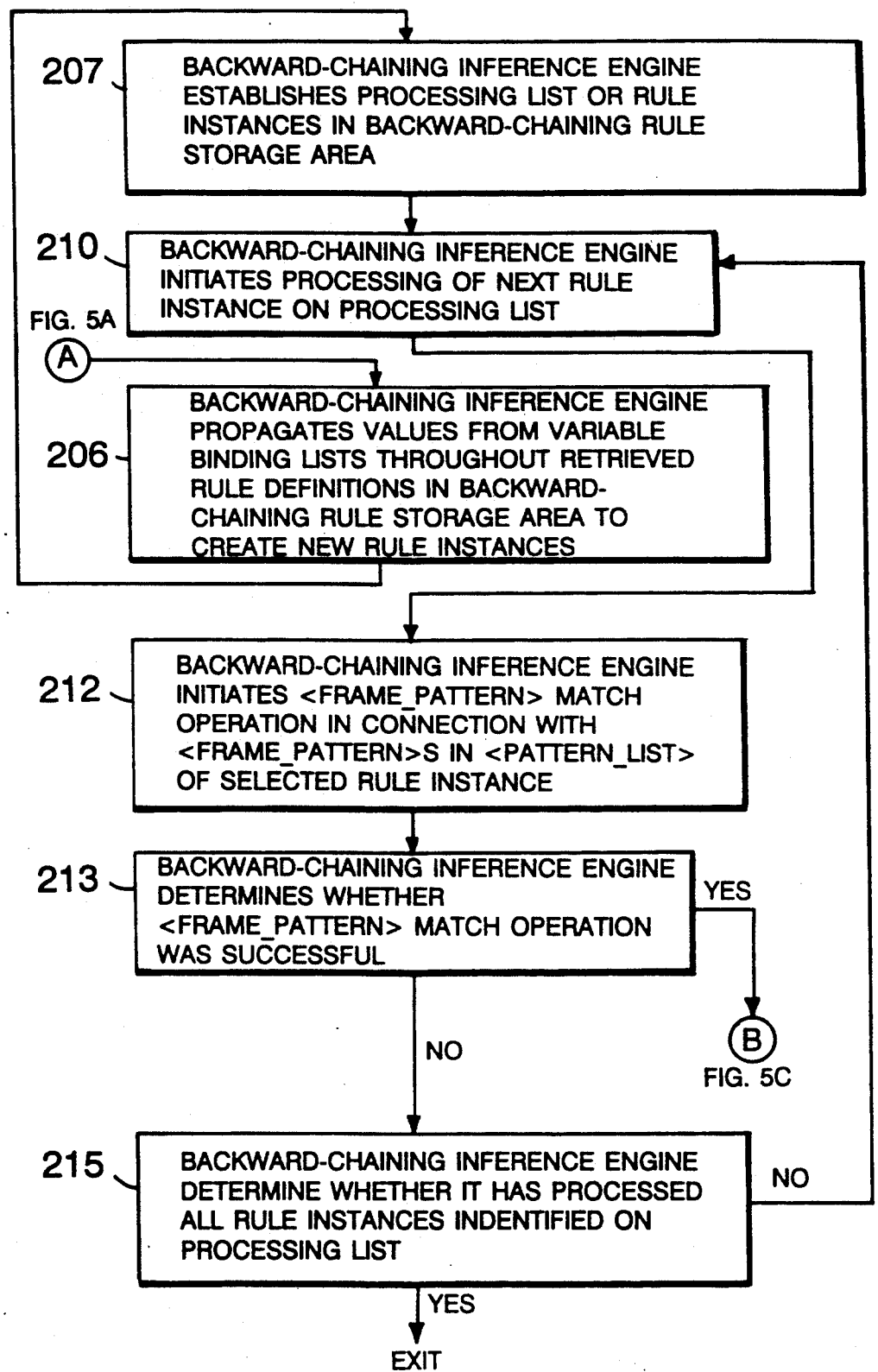

As described above, in response to a backward-chaining command from the operator interface 15, which identifies a goal, or <PRED_PATTERN> predicate pattern, the backward-chaining inference engine 17 initiates a backward-chaining inference operation, which is depicted in detail in FIGS. 5A through 5C. During the backward-chaining inference operation, the backward-chaining inference engine 17 first initiates operations, which are depicted in FIG. 5A, to effect retrieval of those backward-chaining rules in rules portion 11 of database system 10 which are likely to prove the goal, and storage of the retrieved backward-chaining rules in the backward-chaining rule storage area 19.

After the rules have been retrieved, the backward-chaining inference engine 17 initiates processing operations, depicted in FIGS. 5B through 5C, in connection with the each of the rules in the backward-chaining rule storage area 19 and the contents the facts portion 12 of database system 10, to determine whether any of the rules are satisfied. If at least one rule is satisfied, the top-level goal from the operator interface 15 is deemed proven true.

During the processing of each backward-chaining rule, the backward-chaining inference engine 17 initiates pattern matching operations in connection with <FRAME_PATTERN>s, all of which are on the right-hand side. In addition, if the matching operation is successful, the backward-chaining inference engine 17 processes each <PRED_PATTERN> predicate pattern on the right-hand side, which defines a sub-goal, in the same manner as a top level goal received from the operator interface 15. The procedure is repeated iteratively for each <PRED_PATTERN> predicate pattern in a rule defining the top-level goal through each succeeding sub-goal level, the bottom level sub-goal being defined by a backward-chaining rule in which the right-hand side contains only <FRAME_PATTERN>s.

The various sub-goal levels essentially defines a tree, with each sub-goal at a given level being satisfied if at least one sub-goal therebeneath is shown to be satisfied. The backward-chaining inference engine 17, in proceeding down the tree, continues until either:

(1) a rule is reached in which a right-hand side <FRAME_PATTERN> does not match the facts in the facts portion 12 of database system 10, in which case the sub-goal will not satisfied by the rule along that branch; the backward-chaining inference engine 17 then tries another rule to satisfy the sub-goal, if one exists, or returns to the next-higher sub-goal for the same purpose; or (2) a rule is reached at a sub-goal level in which the right-hand side is only <FRAME_PATTERN>s which match the facts in the facts portion 12 of the database system 10, in which case the bottom level sub-goal along that branch is satisfied; the backward-chaining inference engine 17 then returns to the next higher sub-goal to process other <PRED_PATTERN>s predicate patterns in the next-higher sub-goal.

If the backward-chaining inference engine 17 determines (1) that all of the <FRAME_PATTERN>s in the rule defining the top level goal are satisfied by the facts in the facts portion 12 of the database system 10, and (2) that all of the <PRED_PATTERN>s predicate patterns in a rule defining the top level goal are satisfied, the backward-chaining inference engine 17 reports to the operator interface 15 that the goal has been proven.

With reference to FIG. 5A, the backward-chaining inference engine 17 initially receives the <PRED_PATTERN> predicate pattern and generates a rule retrieval request, which it transmits to the knowledge request translator 14 (step 200). The backward-chaining inference engine 17 supplies, in the rule retrieval request, the <PRED_PATTERN> predicate pattern which it received from the operator interface 15 in initiating the backward-chaining operation.

Upon receiving the rule retrieval request from the backward-chaining inference engine 17, the knowledge request translator 14 generates a database inquiry which identifies the predicate name and field names, and transfers the database inquiry to the data base management module 13 (step 201). The data base management module 13 performs a search operation to identify backward-chaining rules in rules portion 11 of database system 10 having a left-hand side <PRED_PATTERN> predicate pattern which has a PRED_NAME predicate name and at least one F_NAME field name corresponding to those set forth in the database inquiry, it responds with the records 50 and 51 relating to the rule definitions of the identified backward-chaining rules (step 202). After the data base management module 13 has responded with the records 51 (step 204), the knowledge request translator 14 constructs the rules in the backward-chaining rule storage area 19, along with binding lists for the variables in the left-hand side (that is, the goal) <PRED_PATTERN> predicate pattern (step 203).

After the knowledge request translator 14 has constructed the backward-chaining rules in the backward-chaining rule storage area 19 and provided the binding lists, the backward-chaining inference engine 17 creates new rule instances and propagates the variable values in the binding list through the associated rule instances (step 206 . The backward-chaining rule engine then establishes a processing list of the rule instances (step 207) in any convenient order. The processing list may, for example, first list the rules which have only <FRAME_PATTERN>s, and no <PRED_PATTERN>s predicate patterns, on the right-hand side, since those rules have no sub-goals and may be most easily processed.

The backward-chaining inference engine 17 then initiates processing of the first rule instance on the processing list (step 210). The backward-chaining inference engine 17 initiates a frame pattern matching operation in connection with the <FRAME_PATTERN>s of the selected rule instance (step 212). The matching operations initiated by the backward-chaining inference engine 17 are similar to the operations described above in connection with FIGS. 4D through 4F. If the backward-chaining inference engine 17 determines that the match operation was not successful, that is if it determines that, for at least one <FRAME_PATTERN>, the facts in the facts portion 12 of the database system 10 did not satisfy the <FRAME_PATTERN>, the backward-chaining inference engine 17 returns to step 211 to process any additional rule instances on the processing list (step 215). If all of the rules on the processing list have been processed, the backward-chaining inference engine exits.

If, however, the backward-chaining inference engine 17 determines in step 213 that the match operations in connection with all of the <FRAME_PATTERN>s of the rule instance are satisfied, it sequences to step 216 to determine whether the rule instance contains a right-hand side <PRED_PATTERN> predicate pattern. If not, in indicates that the rule instance is satisfied (step 217), thereby indicating that the goal at that level was successful. The backward-chaining inference engine 17 returns an indication that the goal has been satisfied, which may, if the goal was a top level goal, enable it to transmit a success indication to the operator interface 15, or, if the goal was not a top level goal, enable it to return to the next higher level to process the next <PRED_PATTERN> predicate pattern for the rule at that level.

As noted above, a benefit of the system depicted in FIGS. 1 through 5C is that, since the rules, including both the forward-chaining rules and the backward-chaining rules, are stored in the database system 10, since, as is common, the database system 10 may be shared among a number of operators, the rules may be also be shared among a number of operators. In addition, typical database management systems provide extensive capabilities to resolve concurrency of access requests and to facilitate recovery from errors, which are not available in typical expert systems. Furthermore, since the forward- and backward-chaining rules that are moved into the respective storage areas 18 and 19 are only the ones likely to fire or prove the goal, the storage areas need not be sufficiently large as to be able to store all of the forward-chaining and backward-chaining rules, respectively. Since typically the rules storage areas are in the virtual memories of the respective inference engines 16 and 17, the virtual memories need only be large enough to store the rules that are likely to fire or prove the goal, as determined by the knowledge request translator 14.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent is:

1. A system comprising:
    A. a database system including a plurality of records for storing facts and rules, said database system being accessible by a plurality of operators to allow each one of said operators to cause said facts and rules to be retrieved from said database system, said database system including means for managing access to said database system to resolve conflicting requests by said operators for access to said rules;
    B. a knowledge request translator responsive to rule retrieval requests for generating database requests to enable the retrieval of rules from said database system, each rule retrieval being based on rule selection criteria included in said rule retrieval request; and
    C. an inference system, responsive to commands from each one of said operators, for generating rule retrieval requests, including rule selection criteria, and for performing inference operations in connection with rules retrieved from said database system by said knowledge request translator, said inference system enabling the retrieval of facts from said database system for use in connection with the inference operations.

2. A system as defined in claim 1 in which said inference system includes a rule storage area for storing rules and an inference engine, said inference engine generating rule retrieval requests and performing inference operations in connection with rules stored in said rule storage area, said knowledge request translator storing rules retrieved in response to rule retrieval requests in said rule storage area.

3. A system as defined in claim 1 in which said inference system includes:
    A. a rule retrieval request portion that generates rule retrieval requests, each including rule selection criteria; and
    B. a rule processing portion that performs inference operations in connection with the rules retrieved by the knowledge request translator in response to the rule retrieval request.

4. A system as defined in claim 3, each said rule including a rule value expression element identifying at least one relational operation in connection with a fact in said database system and a value expression in said rule, in which said rule processing portion includes:
    A. a constant processing portion for processing rule value expression elements whose value expressions are constant values in connection with facts in said database system to identify a logical conclusion;
    B. a variable processing portion for processing rule value expression elements whose value expressions are variable values in connection with facts in said database system to generate a binding list to identify the values of said variable value expressions which provide a selected logical conclusion; and
    C. a control portion for controlling the operation of said constant processing portion and said variable processing portion.

5. A system as defined in claim 4 in which said control portion first enables said constant processing portion to process rule value expression elements of rules all of whose rule value expression elements are constant values and subsequently enables said variable processing portion and said constant processing portion to process rule value expression elements of rules at least one of whose rule value expression elements is a variable value.

6. A system as defined in claim 4 in which:
    A. the constant processing portion generates a constant pattern-matching request in response to a rule value expression element;
    B. the knowledge request translator generates a database inquiry in response to the constant pattern-matching request, the database inquiry identifying the rule value expression element; and
    C. the database system performs an existence operation in connection with the rule value expression element.

7. A system as defined in claim 6 in which a rule value expression element identifies a relation by class name and a value, the database system performing the existence operation by determining whether a relation exists which is identified by the class name and which contains the value.

8. A system as defined by claim 7 in which the rule value expression element further identifies a slot name associated with the value, the database system further performing the existence operation by determining whether a relation exists which is identified by the class name and slot name and which contains the value.

9. A system as defined in claim 4 in which:
    A. the variable processing portion generates a variable pattern-matching request in response to a rule value expression element;
    B. the knowledge request translator generates a database inquiry in response to the variable pattern-matching request, the database inquiry identifying the rule value expression element; and C. the database system performs a binding list generation operation in connection with the rule value expression element to identify variable values.

10. A system as defined in claim 9 in which a rule value expression element identifies a relation by class name and a value, the database system performing the binding list generation operation by identifying selected values associated with a relation which is identified by the class name.

11. A system as defined by claim 10 in which the rule value expression element further identifies a slot name associated with the value, the database system further performing the binding list generation operation by identifying selected values associated with a relation which is identified by the class name and slot name.

12. A system as defined in claim 1 in which the inference system operates in response to commands specified by said rules.

13. A system as defined in claim 12 in which the rules comprise rule elements at least some of which identify a relation identified by class name and include an update command that enables a relation, identified by a class name, to be updated, the inference system generating a rule retrieval request identifying the class name enabling the knowledge request translator to, in turn, generate a database request to enable retrieval of rules from the database system associated with the class name.

14. A system as defined in claim 13 in which the database system includes rules comprising a plurality of records each including a class name field, the database system, in response to a database request, retrieves records the contents of whose class name field corresponds to the class name in the rule retrieval request.

15. A system as defined in claim 13 in which at least some of the rule elements further identify a slot in the identified relation, the slot being further identified by a slot name, the rule retrieval request generated by the inference system further identifying the slot name which enables the knowledge request translator to, in turn, generate a database request to enable retrieval of rules from the database system associated with the class name and the slot name.

16. A system as defined in claim 15 in which the database system includes rules comprising a plurality of records each including a class name field and at least some including a slot name field, the database system, in response to a database request, retrieving records the contents of whose class name field corresponds to the class name in the rule retrieval request and the slot name in the rule retrieval request.

17. A system as defined in claim 12 in which the rules comprise rule elements at least some of which identify a relation identified by class name and include a create command that enables a relation, identified by a class name, to be created, the inference system generating a rule retrieval request identifying the class name enabling the knowledge request translator to, in turn, generate a database request to enable retrieval of rules from the database system associated with the class name.

18. A system as defined in claim 17 in which the database system includes rules comprising a plurality of records each including a class name field, the database system, in response to a database request, retrieves records the contents of whose class name field corresponds to the class name in the rule retrieval request.

19. A system as defined in claim 17 in which at least some of the rule elements further identify a slot in the identified relation, the slot being further identified by a slot name, the rule retrieval request generated by the inference system further identifying the slot name which enables the knowledge request translator to, in turn, generate a database request to enable retrieval of rules from the database system associated with the class name and the slot name.

20. A system as defined in claim 19 in which the database system includes rules comprising a plurality of records each including a class name field and at least some including a slot name field, the database system, in response to a database request, retrieving records the contents of whose class name field corresponds to the class name in the rule retrieval request and the slot name in the rule retrieval request.

21. A system as defined in claim 12 in which the rules comprise rule elements at least some of which identify a relation identified by class name and include a delete command that enables a relation, identified by a class name, to be deleted, the inference system generating a rule retrieval request identifying the class name enabling the knowledge request translator to, in turn, generate a database request to enable retrieval of rules from the database system associated with the class name.

22. A system as defined in claim 21 in which the database system includes rules comprising a plurality of records each including a class name field and a negated flag, the database system, in response to a database request, retrieves records the contents of whose class name field corresponds to the class name in the rule retrieval request and whose negated flags are set.

23. A system as defined in claim 21 in which at least some of the rule elements further identify a slot in the identified relation, the slot being further identified by a slot name, the rule retrieval request generated by the inference system further identifying the slot name which enables the knowledge request translator to, in turn, generate a database request to enable retrieval of rules from the database system associated with the class name and the slot name.

24. A system as defined in claim 23 in which the database system includes rules comprising a plurality of records each including a class name field and at least some including a slot name field, the database system, in response to a database request, retrieving records the contents of whose class name field corresponds to the class name in the rule retrieval support and the slot name in the rule retrieval request.

25. A system as defined in claim 12 in which the rules including backward-chaining rules that comprise rule elements at least some of which identify a relation identified by class name, and include a backward chaining command, the inference system generating a rule retrieval request identifying the class name enabling the knowledge request translator to, in turn, generate a database request to enable retrieval of backward-chaining rules from the database system associated with the class name.

26. A system as defined in claim 25 in which the database system includes backward-chaining rules comprising a plurality of records each including a class name field, the database system, in response to a database request, retrieves records the contents of whose class name field corresponds to the class name in the rule retrieval request.

27. A system as defined in claim 25 in which at least some of the rule elements further identify a slot in the identified relation, the slot being further identified by a slot name, the rule retrieval request generated by the inference system further identifying the slot name which enables the knowledge request translator to, in turn, generate a database request to enable retrieval of backward-chaining rules from the database system associated with the class name and the slot name.

28. A system as defined in claim 27 in which the database system includes backward-chaining rules comprising a plurality of records each including a class name field and at least some including a slot name field, the database system, in response to a database request, retrieving records the contents of whose class name field corresponds to the class name in the rule retrieval request and the slot name in the rule retrieval request.

29. A system as defined in claim 1, each rule including at least one rule value expression element having an associated name, relational operation and value expression, each rule retrieval request including, as the selection criteria, a name, said knowledge request translator enabling the retrieval from said database system of rules having at least one rule value expression element which includes a name corresponding to the name included with the rule retrieval request.

30. A system as defined in claim 29, the name associated with each rule value expression element having a major portion and a minor portion, each rule retrieval request including, as the selection criteria, a name having a major portion and a minor portion, said knowledge request translator enabling a rule retrieval using both the major portion and minor portion of said name.

31. A system as defined in claim 29 in which said database system includes:
 A. a rule storage portion including a plurality of records each for storing a rule value expression element, said record including a name field for storing a name, and
 B. a database management portion for retrieving the contents of said rule storage portion in response to database requests from said knowledge request translator each including a name, the database management portion retrieving records from said rule storage portion the contents of whose name fields correspond to the name in said database requests.

32. A system as defined in claim 31 in which each record further includes a rule identification field for storing the identification of a rule, said knowledge request translator enabling the database management portion to retrieve, in response to a database request, all of the records relating to the rule identified by the contents of the record including the name retrieved in response to the database request.

33. A system as defined in claim 32, said record further including a sequence identification field identifying the sequence of said rule value expression element in said rule, said knowledge request translator including a rule assembly portion for assembling a rule in the order identified in the sequence identification field in response to the receipt of the records relating to the rule, the assembled rule to thereafter be used by the inference system in connection with a inference operation.

34. A system comprising:
 A. a database system including a plurality of records for storing facts and rules, said database system being accessible by a plurality of operators to allow each one of said operators to cause said facts and rules to be retrieved from said database system, said database system including means for managing access to said database system to resolve conflicting requests by said operators for access to said rules;
 B. a knowledge request translator responsive to rule retrieval requests for generating database requests to enable the retrieval of rules from said database system, each rule retrieval being based on rule selection criteria included in said rule retrieval request, said knowledge request translator assembling the retrieved rules in a rule virtual memory; and
 C. an inference system, responsive to commands from each one of said operators, for generating rule retrieval requests, including rule selection criteria, and for performing inference operations in connection with rules in said rule virtual memory, said inference system enabling the retrieval of facts from said database system for use in connection with the inference operations.

35. A method as defined in claim 34, each rule including at least one rule value expression element having an associated name, relational operation and value expression, each rule retrieval request including, as the selection criteria, a name, rule retrieval step including the step of determining whether a rule includes at least one rule value expression element which includes a name corresponding to the name included with the rule retrieval request.

36. A method as defined in claim 35, the name associated with each rule value expression element having a major portion and a minor portion and each rule retrieval request including, as the selection criteria, a name having a major portion and a minor portion, the rule retrieval step including the steps of determining whether a rule includes at least one rule value expression element which includes a major portion which corresponds to the major portion of said selection criteria and said rule value expression element which includes a minor portion which corresponds to the minor portion of said selection criteria.

37. A method as defined in claim 35 in which said database system includes (i) a rule storage portion including a plurality of records each for storing a rule value expression element, said record including a name field for storing a name and a rule identification field for storing the identification of a rule, and (ii) a database management portion for retrieving the contents of said rule storage portion in response to database requests from said knowledge request translator each including a name, the database management portion retrieving records from said rule storage portion the contents of whose name fields correspond to the name in said database requests, said rule retrieval step including the step of retrieving, in response to a database request, all of the records relating to the rule identified by the contents of the record including the name retrieved in response to the database request.

38. A method as defined in claim 37 said record further including a sequence identification field identifying the sequence of said rule value expression element in said rule, said rule retrieval step including the step of assembling a rule, using the contents of the sequence identification field of the retrieved records in response to the receipt of the records relating to the rule.

39. A method comprising the steps of:
A. maintaining a database system including a plurality of records for storing facts and rules;
B. permitting each one of a plurality of operators to access said database system to cause said facts and rules to be retrieved therefrom and managing access to said database system to resolve conflicting requests by said operators for access to said rules;
C. generating a rule retrieval request including rule selection criteria in response to commands from each one of said operators;
D. retrieving rules from said database system in response to the rule selection criteria and assembling the retrieved rules in a rule virtual memory; and
E. performing an inference operation in connection with rules in said rule virtual memory in connection with facts from said database system.

40. A method as defined in claim 39, each said rule including a rule value expression element identifying at least one relational operation in connection with a fact in said database system and a value expression in said rule, in which the inference operation performance step includes the steps of:
A. processing rule value expression elements of rules all of whose rule value expression elements include value expressions which are constant values in connection with facts in said database system to identify a logical conclusion;
B. processing rule value expression elements which contain value expressions that include variable values, of rules which include rule value expression elements whose value expressions include variable values, in connection with facts in said database system to generate a binding list to identify the values of said variable value expressions which provide a selected logical conclusion; and
C. processing rule value expression elements which contain value expressions that include constant values, of rules which include rule value expression elements whose value expressions include variable values, in connection with facts in said database system to provide the selected logical conclusion.

* * * * *